(12) United States Patent
Yamaguchi et al.

(10) Patent No.: US 7,520,363 B2
(45) Date of Patent: Apr. 21, 2009

(54) VEHICLE SAFETY DEVICE

(75) Inventors: Hiroyoshi Yamaguchi, Yokohama (JP);
Minoru Takakura, Yokohama (JP); Eiji Shimizu, Yokohama (JP); Yorimitsu Hirata, Fuchu-cho (JP); Mitsuru Wakiie, Fuchu-cho (JP); Arihiro Furumoto, Fuchu-cho (JP); Takashi Ebisugi, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 371 days.

(21) Appl. No.: 11/370,865

(22) Filed: Mar. 9, 2006

(65) Prior Publication Data

US 2006/0213709 A1 Sep. 28, 2006

(30) Foreign Application Priority Data

Mar. 24, 2005 (JP) ............................. 2005-087139
Mar. 24, 2005 (JP) ............................. 2005-087140

(51) Int. Cl.
*B60R 21/34* (2006.01)
(52) U.S. Cl. .................................. 180/274; 180/69.21
(58) Field of Classification Search ................ 180/274, 180/69.21; *B60R 21/34*
See application file for complete search history.

(56) References Cited

FOREIGN PATENT DOCUMENTS

| | | |
|---|---|---|
| EP | 1493928 | 1/2005 |
| JP | 09315266 | 12/1997 |
| JP | 11-310158 | 11/1999 |
| JP | 2002-37016 | 2/2002 |
| JP | 2002-37125 | 2/2002 |
| JP | 2003-89362 | 3/2003 |
| JP | 2006264556 A | * 10/2006 |
| JP | 2006264557 A | * 10/2006 |
| JP | 2008056120 A | * 3/2008 |

OTHER PUBLICATIONS

European Search Report, May 6, 2006.

* cited by examiner

*Primary Examiner*—John Q. Nguyen
*Assistant Examiner*—Nicole Verley
(74) *Attorney, Agent, or Firm*—Studebaker & Brackett PC; Donald R. Studebaker

(57) ABSTRACT

A vehicle safety device (13) includes an actuator (17) which thrusts a hood (11) upward from underside at a point close to a rear end of the hood (11) to raise the same by a specific amount when an obstacle is detected, and a mechanical connector (21) which connects the rear end of the hood (11) to the vehicle body (12), the mechanical connector (21) being structured such that, when the actuator (17) raises the rear end of the hood (11), the mechanical connector (21) extends while swinging about a pivot (P) by which the mechanical connector (21) is joined to the vehicle body (12). The mechanical connector (21) includes a rod (24), and a locking part (26) having a through hole (32a) in which the rod (24) is inserted. The locking part (26) engages with the rod (24) in such a manner that the rod (24) can move in only one direction in which the rod (24) is extracted from the locking part (26), and the rod (24) is disengaged from the locking part (26) when turned about a longitudinal axis.

9 Claims, 16 Drawing Sheets

US 7,520,363 B2

VEHICLE SAFETY DEVICE

BACKGROUND OF THE INVENTION

1. Field of the Invention

The present invention relates to a vehicle safety device provided on a hood which covers an engine room at a frontal part of a vehicle.

2. Description of the Related Art

Recent developments in automotive technology provide arrangements for lifting a hood of a vehicle covering an engine room in the event of a collision of a vehicle with an obstacle so that the raised hood would receive the obstacle and mitigate an impact acting on the obstacle in the collision (refer to Japanese Unexamined Patent Publication Nos. 2002-37125 and 2003-89362).

An arrangement described in Japanese Unexamined Patent Publication No. 2003-89362 is such that a motor 1 turns when a control signal is fed from a control unit and, as a consequence, a movable plate 2 moves rearward and a link 3 connected to the movable plate 2 goes into an upright position in an interlocked fashion, whereby a rear part of a hood connected to the link 3 via a bracket 4 is lifted as shown in FIG. 22.

An arrangement described in Japanese Unexamined Patent Publication No. 2002-37125 includes a pair of links 5 connected to each other and a first actuator 8, one of the links 5 being joined to a bracket 6 which is fixed to a hood and the other being joined to a vehicle body 7. When a collision with an obstacle is detected, the first actuator 8 extends and the links 5 which have been folded become extended, whereby the hood is lifted as shown in FIG. 23.

If the hood of a vehicle provided with this kind of vehicle safety device is lifted as a result of activation thereof caused by too sensitive detection of an obstacle, for example, a driver must lower the hood which has been lifted to obtain an unobstructed forward view and drive the vehicle to a nearest repair shop or like facility.

In the aforementioned vehicle safety device of Japanese Unexamined Patent Publication No. 2003-89362, the motor 1 is run in a reverse direction to bring the link 3 which has been erected to the upright position back to a generally horizontal position in order thereby to lower the hood. In the aforementioned vehicle safety device of Japanese Unexamined Patent Publication No. 2002-37125, on the other hand, a second actuator 9 pulls a wire 10 to fold back the links 5 which have been extended in order thereby to lower the hood.

The vehicle safety devices of the prior art require the motor 1 which is rather expensive or the dedicated second actuator 9 (besides the first actuator 8) for lowering the hood which has been lifted as seen above. These prior art arrangements would inevitably entail higher cost or system complication. Moreover, the prior art arrangements require a space for installing the motor 1 or the second actuator 9, so that the safety device increases in size and a site for installation thereof is limited.

SUMMARY OF THE INVENTION

Intended to provide a solution to the aforementioned problems of the prior art, the present invention has as an object the provision of a vehicle safety device which can provide an unobstructed forward view for a driver of a vehicle by lowering a hood which has once been lifted upward by means of a simple and low-cost mechanism.

A vehicle safety device of the invention is provided on a hood which covers an engine room of a vehicle when a forward end of the hood is hooked to a vehicle body. To achieve the aforementioned object of the invention, the vehicle safety device includes an actuator which applies an upward thrusting force to the hood from underside at a point close to a rear end thereof to raise the rear end of the hood by a specific amount when an obstacle is detected, and a mechanical connector which connects the rear end of the hood to the vehicle body, the mechanical connector being structured such that, when the actuator raises the rear end of the hood, the mechanical connector extends while swinging about a pivot by which the mechanical connector is joined to the vehicle body. The mechanical connector includes a rod, and a locking part having a through hole in which the rod is inserted, wherein the locking part engages with the rod in such a manner that the rod can move in only one direction in which the rod is extracted from the locking part, and the rod is disengaged from the locking part when the rod and the locking part are relatively turned about a longitudinal axis of the rod.

In the vehicle safety device thus structured, the actuator applies an upward thrusting force to the hood from underside at a point close to the rear end of the hood of which forward end is joined to the vehicle body, causing the mechanical connector connecting the rear end of the hood to the vehicle body to extend, when an obstacle is detected. With this arrangement, the rear end of the hood is lifted in a swinging motion about a locking point where the forward end of the hood is locked to the vehicle body in the event of a collision with the obstacle. Therefore, the raised hood can receive the obstacle and effectively mitigate an impact acting on the obstacle in the collision.

According to the invention, the rod can be disengaged from the locking part by relatively turning the rod and the locking part about the longitudinal axis of the rod and, then, the rod can be retracted into the through hole in the locking part. Therefore, a user can contract the once extended mechanical connector and lower the hood quite easily to obtain an unobstructed forward view from a driver's seat.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

A vehicle safety device 13 according to a first embodiment of the invention is now described with reference to FIGS. 1 to 11.

Figure 1:
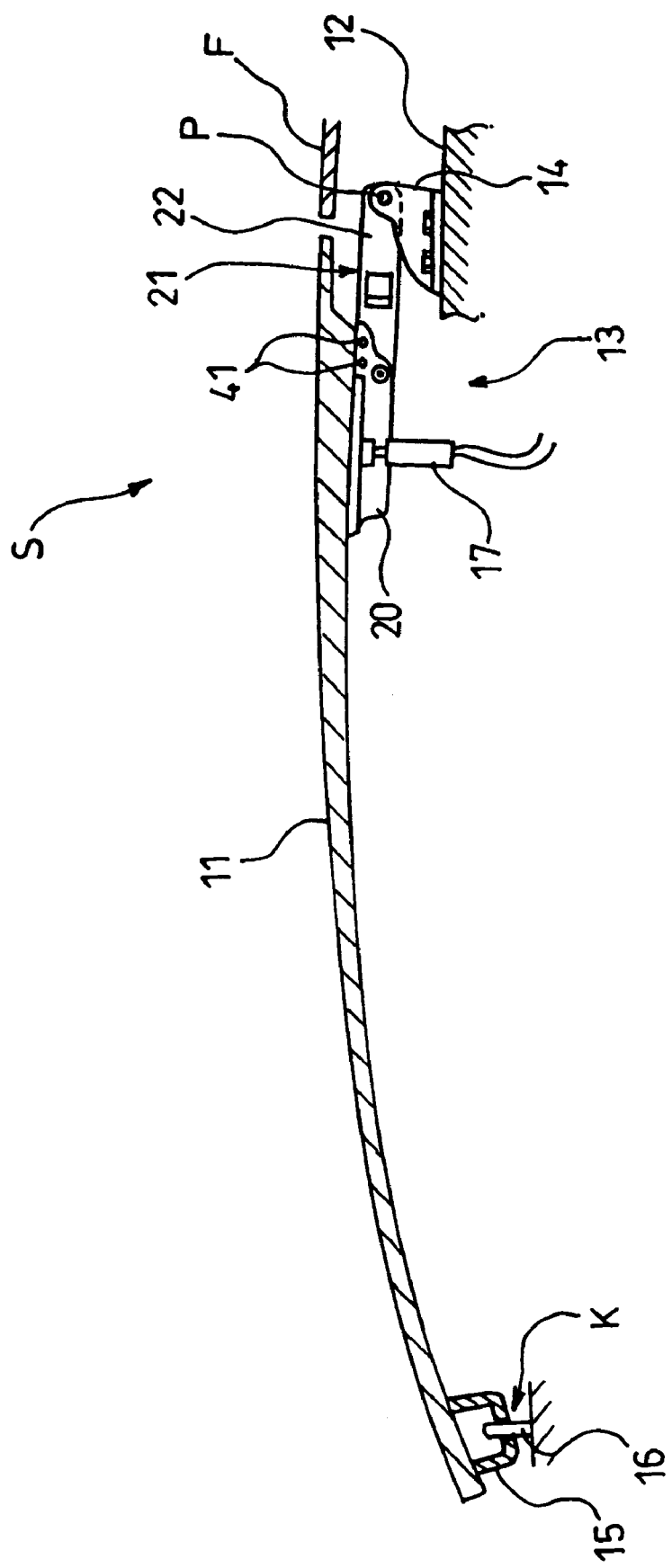
FIG. 1 is a side view of a hood and associated components of a vehicle provided with a vehicle safety device according to a first embodiment of the invention.
Figure 2:
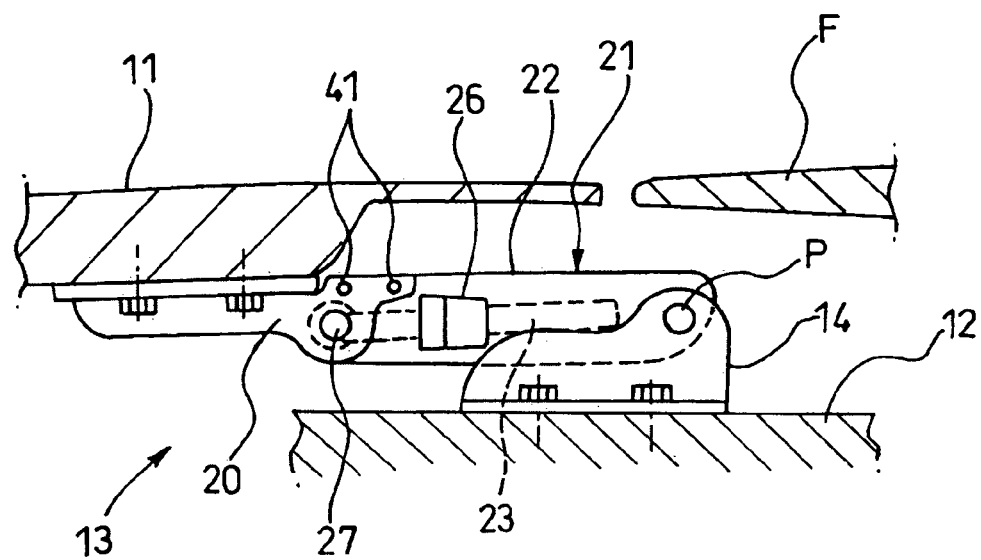
FIG. 2 is a side view of the vehicle safety device of the first embodiment.
Figure 3:
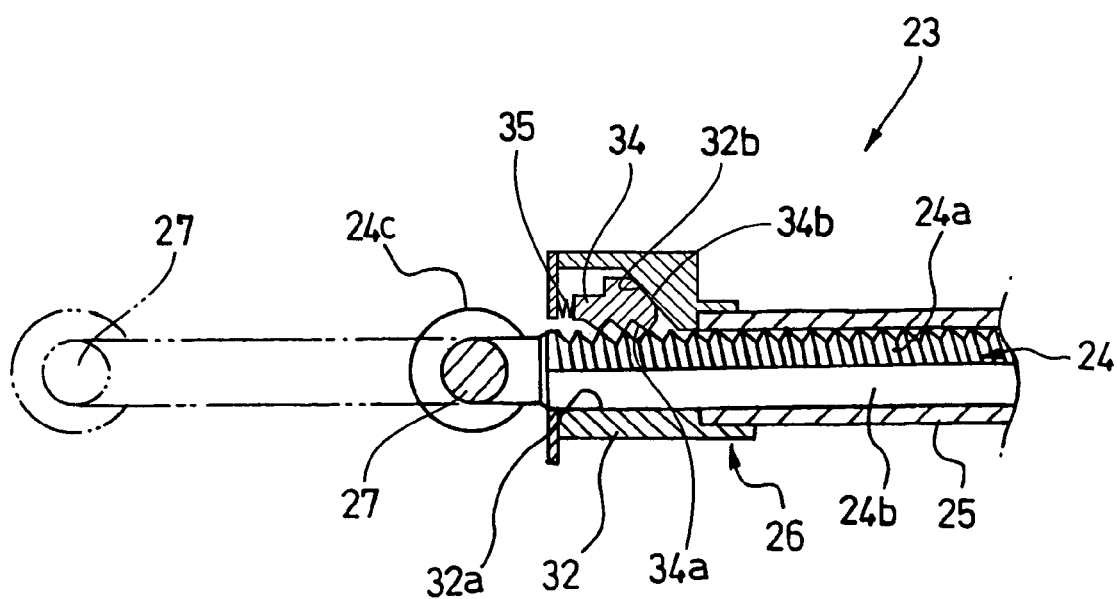
FIG. 3 is a sectional view of a locking mechanism of the vehicle safety device of the first embodiment.
Figure 4:
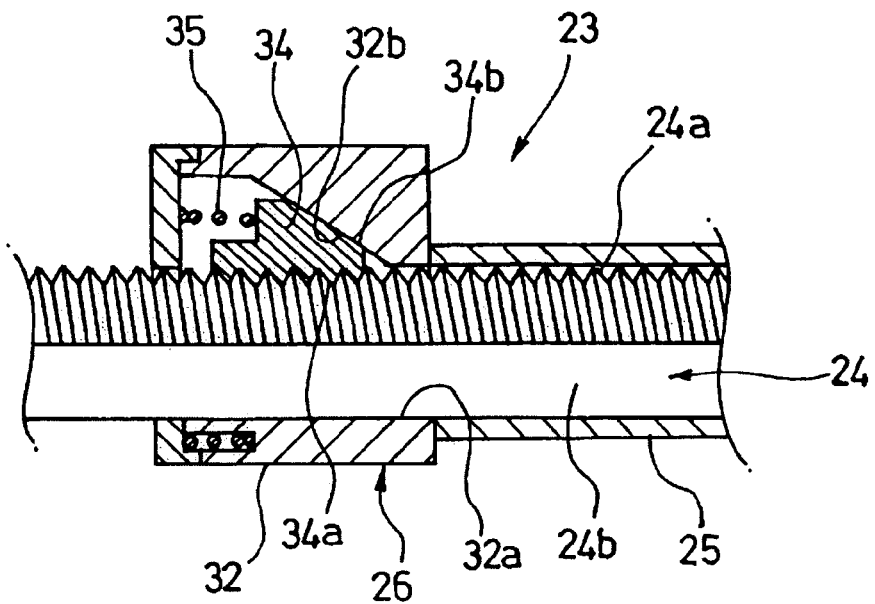
FIG. 4 is a sectional view illustrating the working of the locking mechanism.
Figure 5:
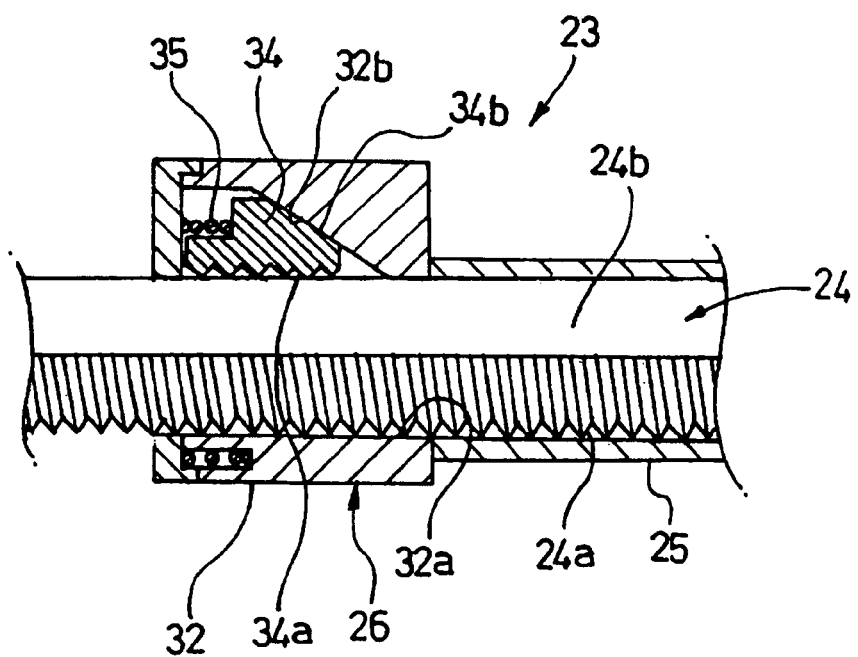
FIG. 5 is a sectional view illustrating also the working of the locking mechanism.
Figure 6:
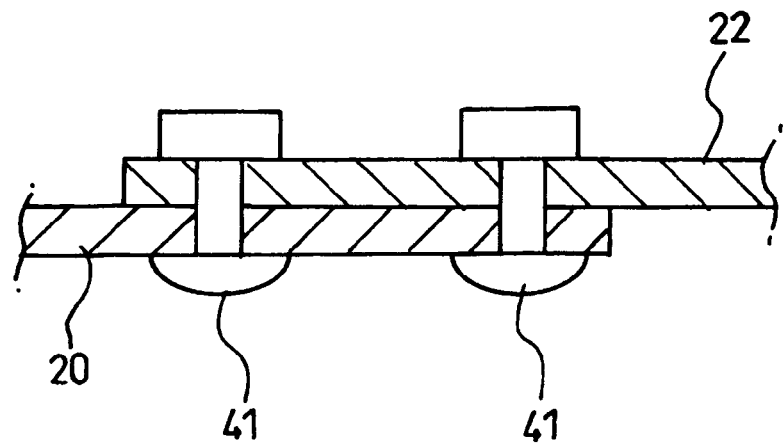
FIG. 6 is a sectional view showing a structure for joining a stationary bracket and a support bracket of the vehicle safety device to each other.
Figure 7:
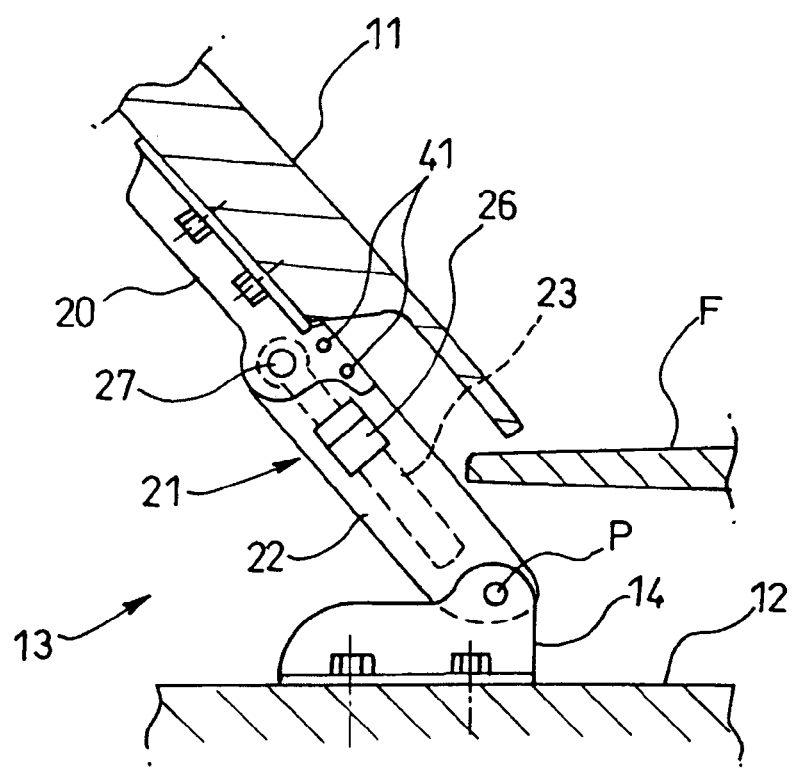
FIG. 7 is a sectional view illustrating how the hood is opened and closed.

FIG. 1 is a side view of a hood 11 and associated components of a vehicle S provided with the vehicle safety device 13 of the first embodiment of the invention, FIG. 2 is a side view of the vehicle safety device 13, FIG. 3 is a sectional view of a lock mechanism constituting the vehicle safety device 13, FIGS. 4 and 5 are sectional views illustrating the working of the lock mechanism, FIG. 6 is a sectional view showing a structure for joining a stationary bracket 20 and a support bracket 14 of the vehicle safety device 13 to each other, and FIG. 7 is a sectional view illustrating how the hood 11 is opened and closed.

The hood 11 for covering the top of an engine room is provided at a frontal part of the vehicle S as shown in FIG. 1. The hood 11 is joined at a rear end portion thereof to a body 12 of the vehicle S. The vehicle safety device 13 of the embodiment is disposed at this joint portion between the hood 11 and the vehicle body 12.

Extending rearward from a point near the rear end of the hood 11, the vehicle safety device 13 is connected to the support bracket 14 which is fixed to the vehicle body 12, whereby the vehicle safety device 13 supports the hood 11 swingably about a pivot P by which the vehicle safety device 13 is joined to the support bracket 14.

There is provided a hook 15 on a bottom side of the hood 11 close to a forward end thereof. When the hook 15 is snapped onto a hood lock 16 provided on the vehicle body 12, the hood 11 is kept from swinging about the pivot P and held in a position where the hood 11 covers the top of the engine room.

On the bottom side of the hood 11 near the rear end thereof, there is provided a pyrotechnic actuator 17 which instantly extends when ignited as a result of an explosive expansion of a gas. The actuator 17 is connected to an obstacle sensor which is not illustrated. When the obstacle sensor detects an obstacle ahead of the vehicle S, the obstacle sensor outputs an obstacle sensing signal and the actuator 17 instantly extends upward upon receiving this sensing signal.

Referring to FIG. 2, the vehicle safety device 13 includes a mechanical connector 21 for connecting the stationary bracket 20 attached to the hood 11 to the vehicle body 12. With one end of the mechanical connector 21 rotatably connected to the support bracket 14, the mechanical connector 21 swingably supports the hood 11 on the vehicle body 12. The mechanical connector 21 includes a connecting bracket 22 and a locking mechanism 23 attached to the connecting bracket 22.

Referring to FIG. 3, the locking mechanism 23 of the mechanical connector 21 includes a rod 24, a cylinder 25 in which the rod 24 is inserted, and a locking part 26 fitted on one end of the cylinder 25. The rod 24 has a connecting part 27 at one end and this connecting part 27 is joined to the stationary bracket 20 which is fixed to the hood 11 in such a manner that the rod 24 can swing about the connecting part 27 thereof. The rod 24 has external threads (mating part) 24a formed on only a semicylindrical portion on one side of a curved outer surface of the rod 24 along a longitudinal (axial) direction thereof and a smooth surface 24b formed on a semicylindrical portion on the opposite side of the curved outer surface of the rod 24. The rod 24 is made rotatable about a longitudinal (central) axis thereof relative to a head 24c of the rod 24 which holds the connecting part 27.

The locking part 26 has a shell 32 in which a longitudinal through hole 32a is formed, the rod 24 being inserted into the through hole 32a. Inside the shell 32, there is provided a screw plug (meshing plug) 34 which has internal threads (mating part) 34a formed on a surface of the screw plug 34 facing the rod 24. The screw plug 34 is biased by a spring 35 in a direction (rightward direction as illustrated in FIG. 3) in which the rod 24 is inserted into the cylinder 25. The shell 32 and the screw plug 34 have tapered surfaces 32b and 34b, respectively, which are gradually slanted toward the central axis of the rod 24 along the inserting direction thereof. With the tapered surfaces 32b and 34b of the shell 32 and the screw plug 34 in contact with each other, the screw plug 34 is biased in the inserting direction of the rod 24 by a pushing force exerted by the spring 35, so that the screw plug 34 is forced inward toward the central axis of the rod 24. Therefore, under normal conditions, the internal threads 34a of the screw plug 34 and the external threads 24a of the rod 24 are in mesh as shown in FIG. 4 and this meshed condition is maintained.

Under conditions where the side of the curved outer surface of the rod 24 on which the external threads 24a are formed is oriented toward the screw plug 34 as shown in FIG. 4, the internal threads 34a of the screw plug 34 are in mesh with the external threads 24a of the rod 24, so that the screw plug 34 and the rod 24 are locked together and, thus, the rod 24 is kept from moving in its inserting direction. The locking mechanism 23 is held in this locked state under normal conditions. If a thrust is exerted on the rod 24 in a direction opposite to the inserting direction thereof, or in the direction toward the connecting part 27 of the rod 24, when the locking mechanism 23 is in the locked state, the screw plug 34 locked on the rod 24 is forced to move toward the connecting part 27 of the rod 24 overwhelming the pushing force of the spring 35. As the screw plug 34 moves obliquely upward along the tapered surface 32b of the shell 32, the internal threads 34a of the screw plug 34 and the external threads 24a of the rod 24 are released from the meshed condition (locked state) and, as a result, the rod 24 is allowed to move in the direction toward the connecting part 27 thereof as shown by alternate long and two short dashed lines in FIG. 3.

Additionally, if the rod 24 is turned about the central axis thereof so that the smooth surface 24b of the rod 24 is oriented toward the screw plug 34 (or the side of the curved outer surface of the rod 24 on which the external threads 24a are formed is oriented in a direction opposite to the screw plug 34) as shown in FIG. 5, the locking mechanism 23 is transferred from the locked state to an unlocked state in which the rod 24 is disengaged from the screw plug 34. When the locking mechanism 23 is in the unlocked state, the rod 24 can be freely moved along the axial direction thereof relative to the locking part 26. When the locking mechanism 23 is in the locked state, the external threads 24a of the rod 24 are engaged with the internal threads 34a of the screw plug 34 along an angular range equivalent to half a circle or less.

The stationary bracket 20 attached to the hood 11 and the connecting bracket 22 of the mechanical connector 21 are joined to each other by a plurality of rivets 41 fitted in overlapping portions of the stationary and connecting brackets 20, 22 as shown in FIG. 6.

When opening the hood 11 to expose the engine room of the vehicle S equipped with the above-described vehicle safety device 13, a user disengages the hook 15 from the hood lock 16 and raises the forward end of the hood 11. When lifted, the hood 11 swings about the pivot P which joins the hood 11 to the vehicle body 12 and the engine room of the vehicle S is exposed, or opened, as shown in FIG. 7. As can be seen from FIG. 7, there is provided a rear-hood fairing strip F above the pivot P which serves as an axis of swinging motion of the hood 11. In this structure of the embodiment, the hood 11 can be swung up and down in such a manner that the rear end of the hood 11 does not interfere with the rear-hood fairing strip F.

Figure 8:
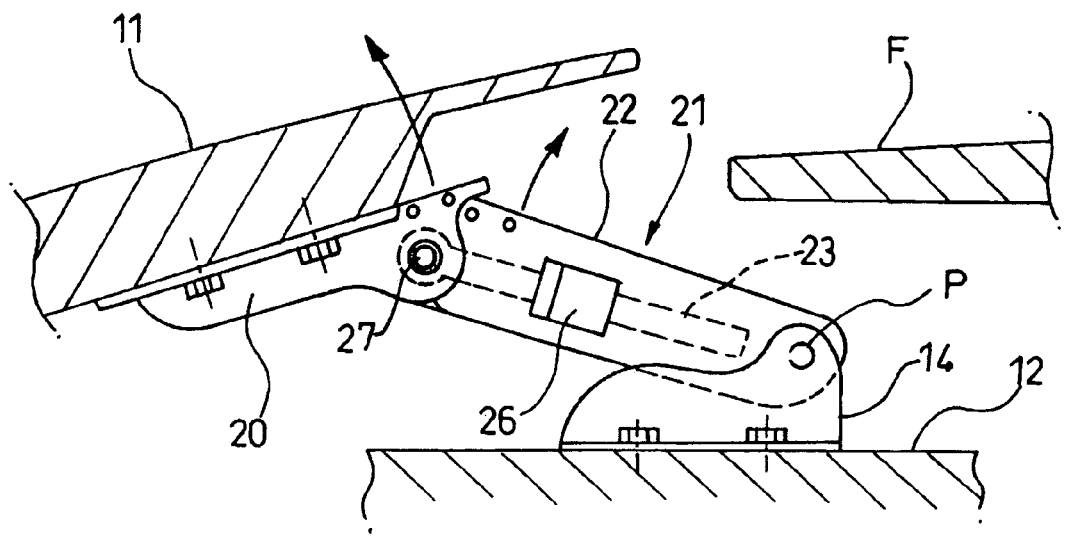
FIG. 8 is a side view illustrating the working of the vehicle safety device of the first embodiment.
Figure 9:
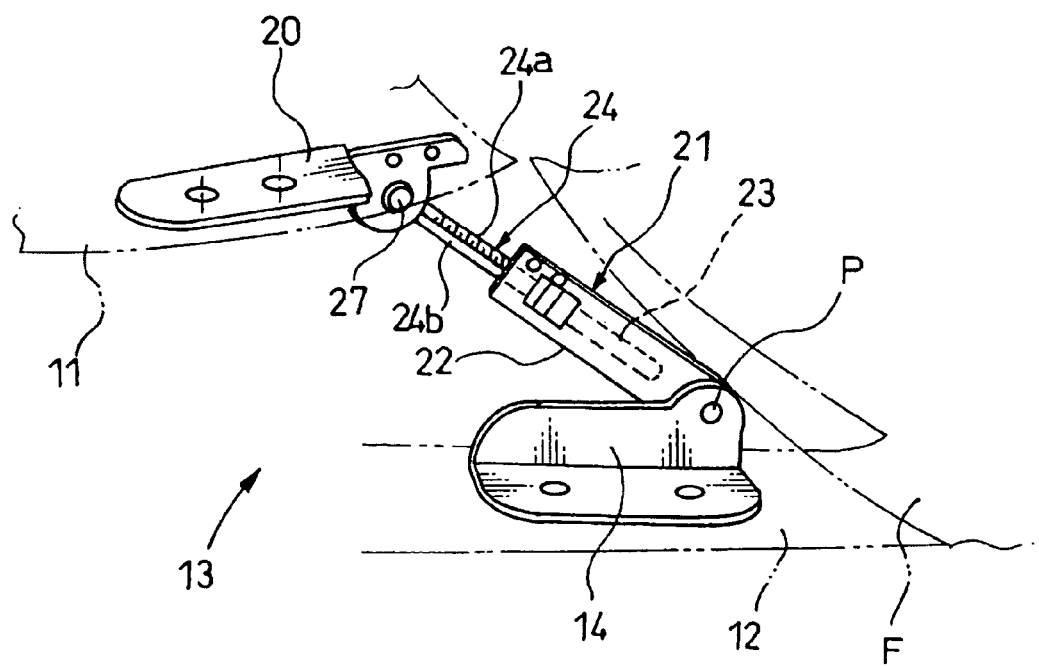
FIG. 9 is a perspective view illustrating the working of the vehicle safety device of the first embodiment.
Figure 10:
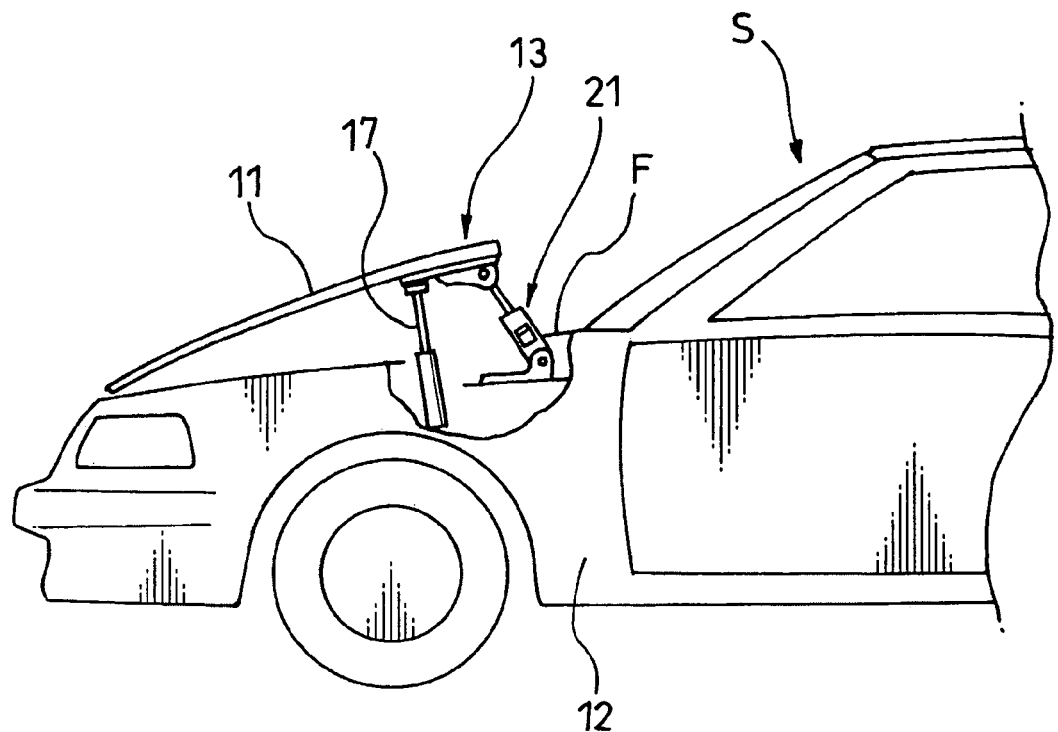
FIG. 10 is a side view of a forward portion of the vehicle illustrating the working of the vehicle safety device of the first embodiment.
Figure 11:
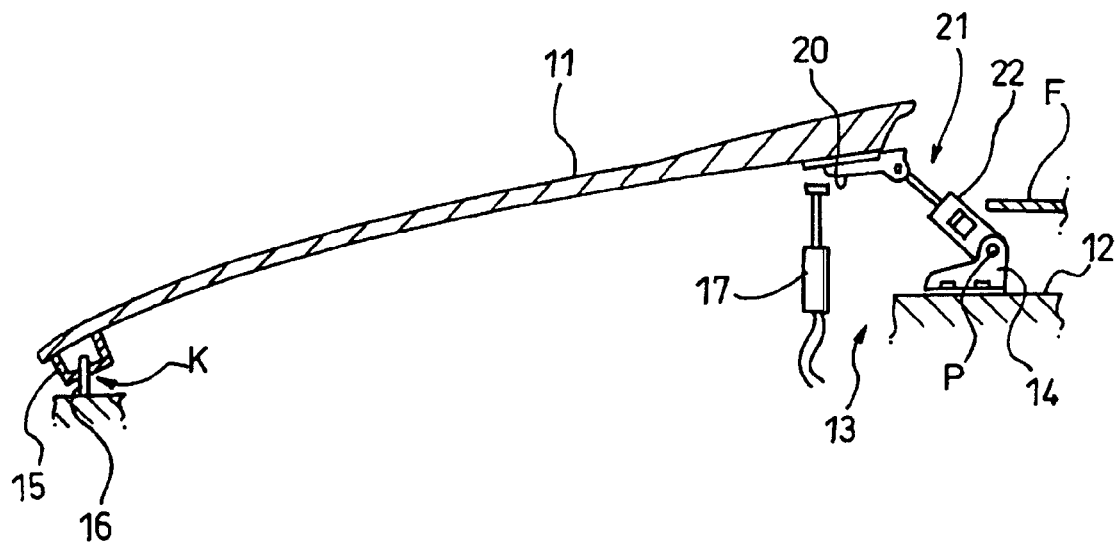
FIG. 11 is a side view of the hood and the associated components of the vehicle illustrating the working of the vehicle safety device of the first embodiment.

Now, the working of the vehicle safety device 13 is described with reference to FIGS. 8 to 11, in which FIG. 8 is a side view of the vehicle safety device 13, FIG. 9 is a perspective view of the vehicle safety device 13, FIG. 10 is a side view of a forward portion of the vehicle S, and FIG. 11 is a side view of the hood 11 and the associated components of the vehicle S.

When the obstacle sensor outputs a sensing signal (electrical signal) upon detecting an obstacle ahead of the vehicle S, the actuator 17 instantly extends, thereby thrusting the rear end of the hood 11 upward from underside.

An upward thrusting force exerted by the actuator 17 produces a swinging force acting on the hood 11 of which forward end is joined to the vehicle body 12 at a locking point K (FIG. 1), so that the rear end of the hood 11 is lifted, or swung up about the locking point K, as shown in FIG. 11. The swinging force exerted on the hood 11 is translated into an upward pulling force acting on a forward end of the mechanical connector 21 which interconnects the stationary bracket 20 attached to the hood 11 and the support bracket 14 attached to the vehicle body 12 through the connecting part 27 of the rod 24 by which the mechanical connector 21 is connected to the stationary bracket 20. The upward pulling force exerted on the forward end of the mechanical connector 21 causes a swinging force acting on the mechanical connector 21 of which rear end is rotatably supported by the pivot P on the vehicle body 12, and this swinging force lifts the forward end of the mechanical connector 21 so that the mechanical connector 21 swings about the pivot P. Therefore, when the rear end of the hood 11 is thrust upward by the actuator 17, the hood 11 is pulled rearward by as much as the amount of play at the locking point K between the hook 15 and the hood lock 16 which are loosely fitted and, then, the stationary bracket 20 and the mechanical connector 21 are forced to swing in opposite turning directions. As a consequence, a shearing strain occurs in the rivets 41 which join the stationary bracket 20 to the connecting bracket 22 of the mechanical connector 21, causing the rivets 41 to eventually break.

When the rivets 41 break in this fashion, the stationary bracket 20 and the mechanical connector 21 swing in the opposite directions as shown in FIG. 8 and the connecting part 27 of the rod 24 is pulled in a direction away from the mechanical connector 21. Consequently, the rod 24 is released from the locking part 26 with the external threads 24a of the rod 24 disengaged from the internal threads 34a of the screw plug 34 and the mechanical connector 21 extends as the rod 24 is partially drawn out of the cylinder 25 as shown in FIG. 9.

As a result of the aforementioned working of the vehicle safety device 13, the rear end of the hood 11 is lifted by a swinging motion about the locking point K between the hook 15 and the hood lock 16, thereby creating a large space below the raised hood 11. Accordingly, when the vehicle S accidentally collides with an obstacle, the hood 11 is set to receive the obstacle while deforming to a great extent, whereby the hood 11 can absorb an impact of collision and lessen as much as possible the influence of the impact to the obstacle which has ridden on the hood 11.

If the hood 11 of the vehicle S provided with the above-described vehicle safety device 13 is lifted as a result of activation thereof caused by too sensitive detection of an obstacle, for example, a user must lower the hood 11 which has been lifted to obtain an unobstructed forward view and drive the vehicle S to a nearest repair shop or like facility.

Described below is a procedure which allows the user to lower the raised hood 11. When lowering the hood 11, the user first unlocks the hook 15 from the hood lock 16 at the front of the vehicle S and lifts the forward end of the hood 11 to expose the engine room. Then, the user turns the rod 24 of the locking mechanism 23 of the mechanical connector 21 by approximately 180 degrees by using a wrench, for instance. As a result, the locking mechanism 23 is set to the unlocked state in which the side of the curved outer surface of the rod 24 on which the external threads 24a are formed is oriented in the direction opposite to the screw plug 34 (or the smooth surface 24b of the rod 24 is oriented toward the screw plug 34) as shown in FIG. 5. When the locking mechanism 23 is set to the unlocked state, the rod 24 is disengaged from the screw plug 34 and the rod 24 can be freely moved along the axial direction thereof relative to the locking part 26.

In this condition, the user returns the rod 24 which has been partially drawn out of the cylinder 25 back into so that the mechanical connector 21 which has extended contracts. Then, the user turns again the rod 24 by approximately 180 degrees to return the locking mechanism 23 back to the locked state in which the side of the curved outer surface of the rod 24 on which the external threads 24a are formed is oriented toward the screw plug 34 as shown in FIG. 4. Finally, the user lower the hood 11 to close off the engine room and forces the forward end of the hood 11 against the vehicle body 12 so that the hook 15 snaps onto the hood lock 16. The user can lower the hood 11 of which rear end has been raised in this fashion to obtain an unobstructed forward view from a driver's seat.

It should be appreciated from the foregoing discussion that the vehicle safety device 13 of the first embodiment enable the user to obtain an unobstructed forward view from the driver's seat by easily lowering the hood 11 of which rear end has been raised even when the actuator 17 lifts the rear end of the hood 11 and the mechanical connector 21 connecting the hood 11 to the vehicle body 12 extends. This is because the user can disengage the rod 24 of the locking mechanism 23 from the locking part 26 by turning the rod 24 and contract the mechanical connector 21 which has once extended. Unlike the earlier-described vehicle safety devices of the prior art which require a complicated and expensive mechanism, the vehicle safety device 13 of the embodiment makes it possible to obtain an unobstructed forward view from the driver's seat by lowering the once raised hood 11 at low cost and with least limitations on mounting space.

The vehicle safety device 13 is provided with the locking mechanism 23 in which the rod 24 connected to the hood 11 is locked by the screw plug 34 when the external threads 24a of the rod 24 mesh with the internal threads 34a of the screw plug 34. Since the locking mechanism 23 can lock the rod 24 to hold the hood 11 in position with this simple structure employing intermeshing corrugated surfaces (i.e., the external and internal threads 24a, 34a), the vehicle safety device 13 of the embodiment can be manufactured at low cost.

The external threads 24a of the rod 24 are engaged with the internal threads 34a of the screw plug 34 along the angular range equivalent to half a circle or less in the first embodiment as stated earlier. If this angular range of engagement between the external threads 24a of the rod 24 and the internal threads 34a of the screw plug 34 is made smaller than 180 degrees (half a circle), the range of turning the rod 24 for disengaging the same from the screw plug 34 (or for releasing the rod 24 from the locking part 26) can be reduced. This would help facilitate operation by the user.

Although the above-described vehicle safety device 13 of the first embodiment is structured such that the locking mechanism 23 is switched between the locked state in which the rod 24 is allowed to slide in one axial direction only and the unlocked state in which the rod 24 is allowed to slide in both axial directions by turning the rod 24 relative to the locking part 26 in which the screw plug 34 is provided, the vehicle safety device 13 may be modified such that the locking mechanism 23 is switched between the locked state and the unlocked state by turning the locking part 26 instead of the rod 24.

Also, the aforementioned intermeshing corrugated surfaces of the rod 24 and the screw plug 34 need not necessarily be the external and internal threads 24a, 34a as in the first embodiment but may be any form of interengagable ridges and furrows having a sawtoothed cross section, for example.

In the vehicle safety device 13 of the first embodiment, the stationary bracket 20 attached to the hood 11 is joined to the connecting bracket 22 of the mechanical connector 21 by the rivets 41 fitted in the overlapping portions of the stationary and connecting brackets 20, 22 and, when the rear end of the hood 11 is raised as a result of activation of the actuator 17 by the sensing signal fed from the obstacle sensor, the rivets 41 break as mentioned earlier. The vehicle safety device 13 of the embodiment may be modified such that the stationary and connecting brackets 20, 22 are joined to each other by an easily releasable engagement mechanism, such as intermeshing protrusions and recesses. If such an easily releasable engagement mechanism is used, it is possible to return the raised hood 11 back to a position where the hood 11 can be swung up and down about the pivot P provided close to the rear end of the hood 11 by lowering the rear end of the hood 11 while contracting the mechanical connector 21, and rejoining the stationary and connecting brackets 20, 22 so that the hood 11 would be supported by the mechanical connector 21.

Second Embodiment

Now, a vehicle safety device 13 according to a second embodiment of the invention is described with reference to FIGS. 12 to 20, in which elements identical or similar to those of the first embodiment are designated by the same reference numerals and a description of such elements is not provided here.

Figure 12:
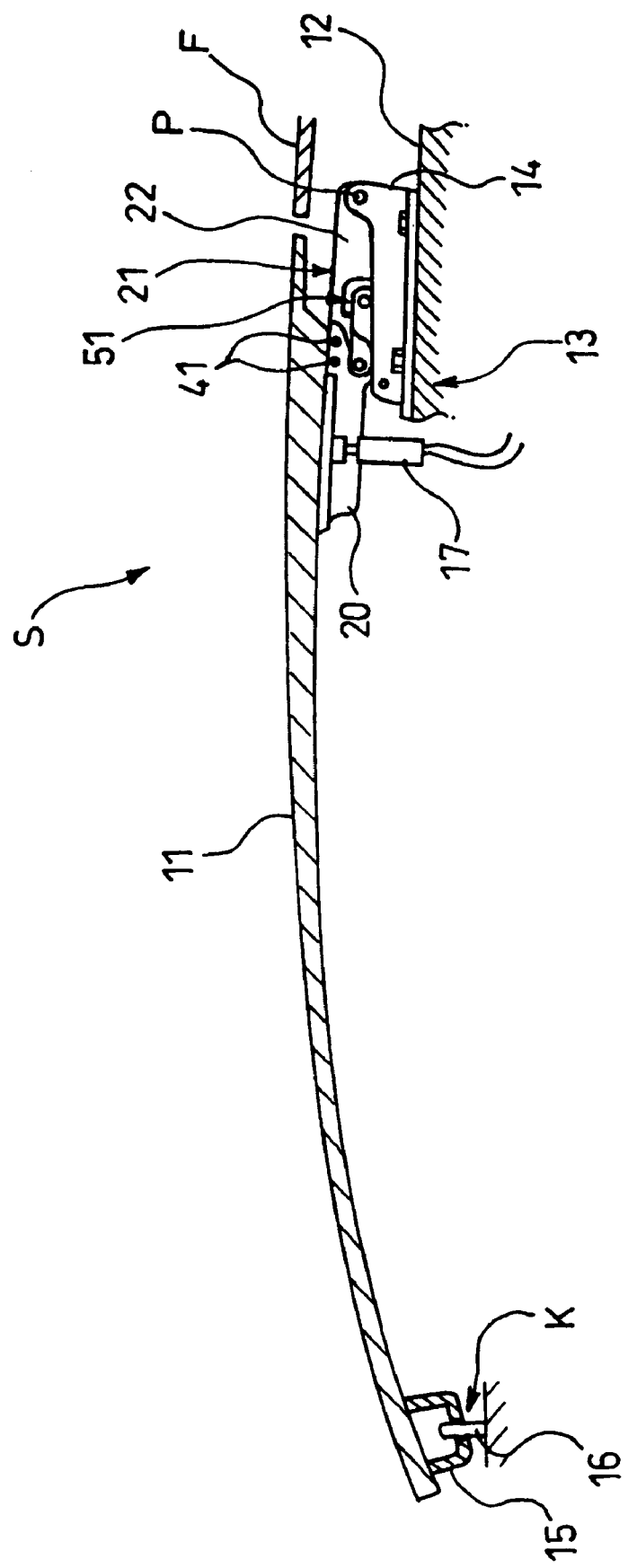
FIG. 12 is a side view of a hood and associated components of a vehicle provided with a vehicle safety device according to a second embodiment of the invention.
Figure 13:
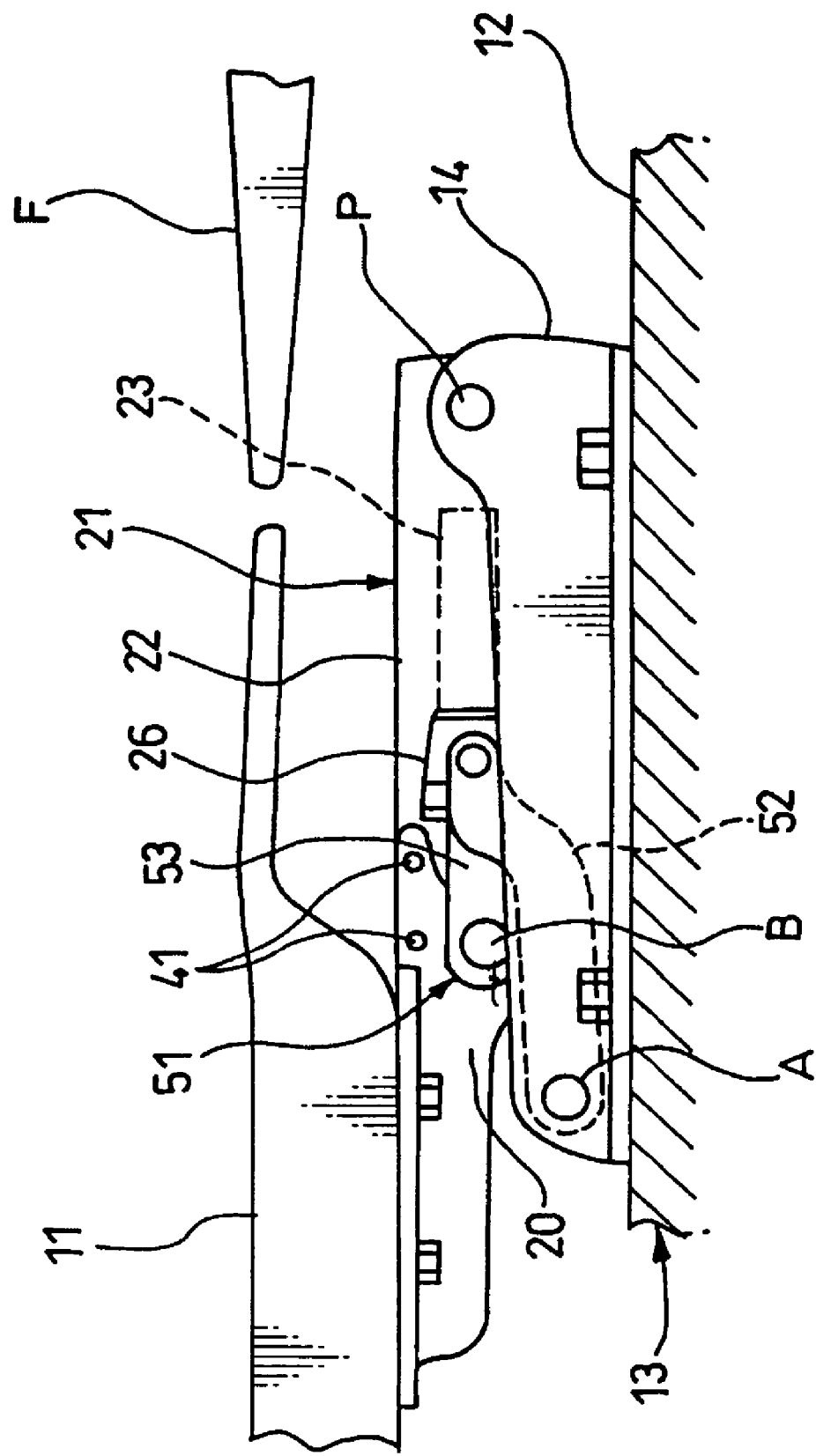
FIG. 13 is a side view of the vehicle safety device of the second embodiment.
Figure 14:
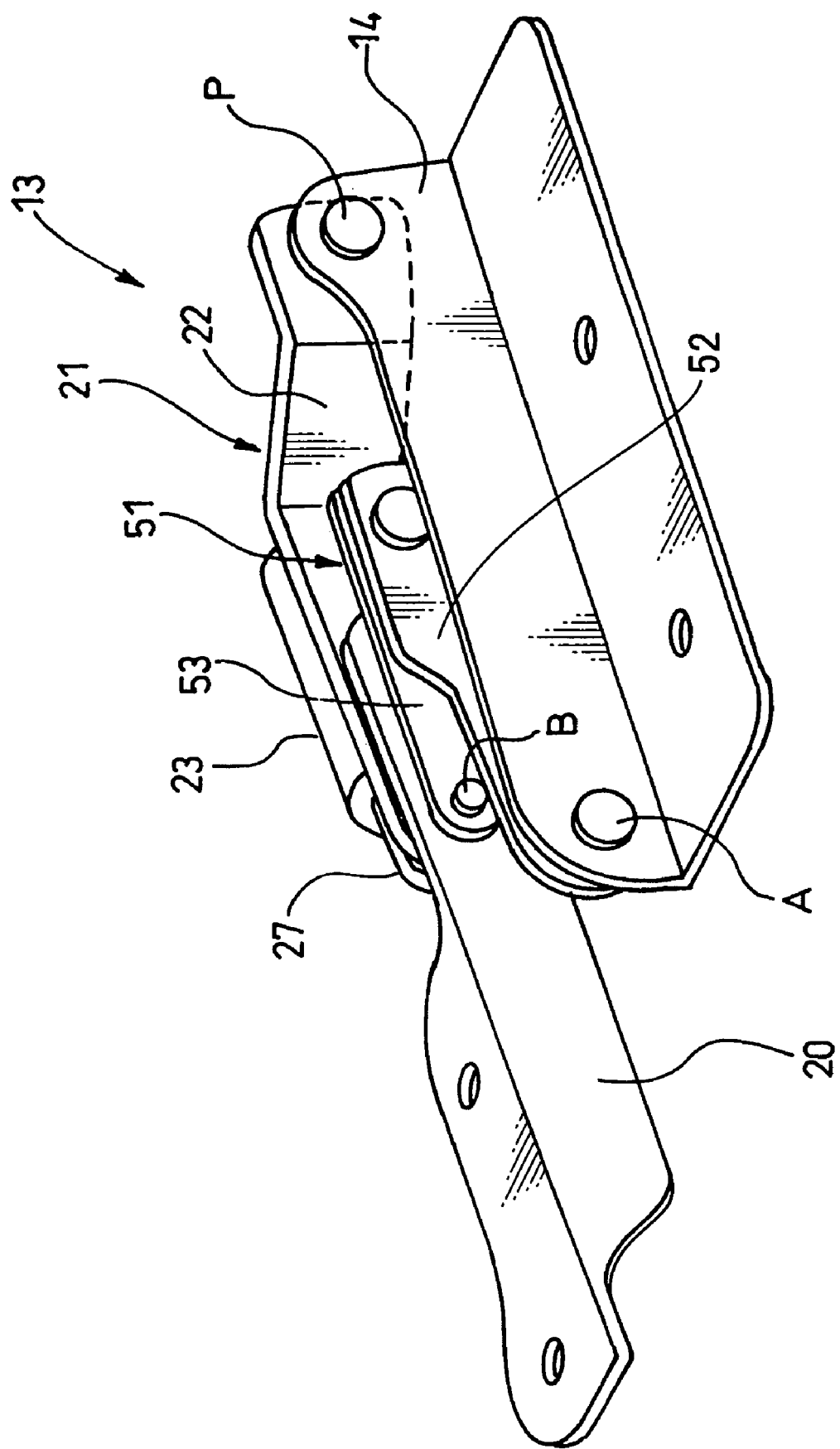
FIG. 14 is a perspective view of the vehicle safety device of the second embodiment.
Figure 15:
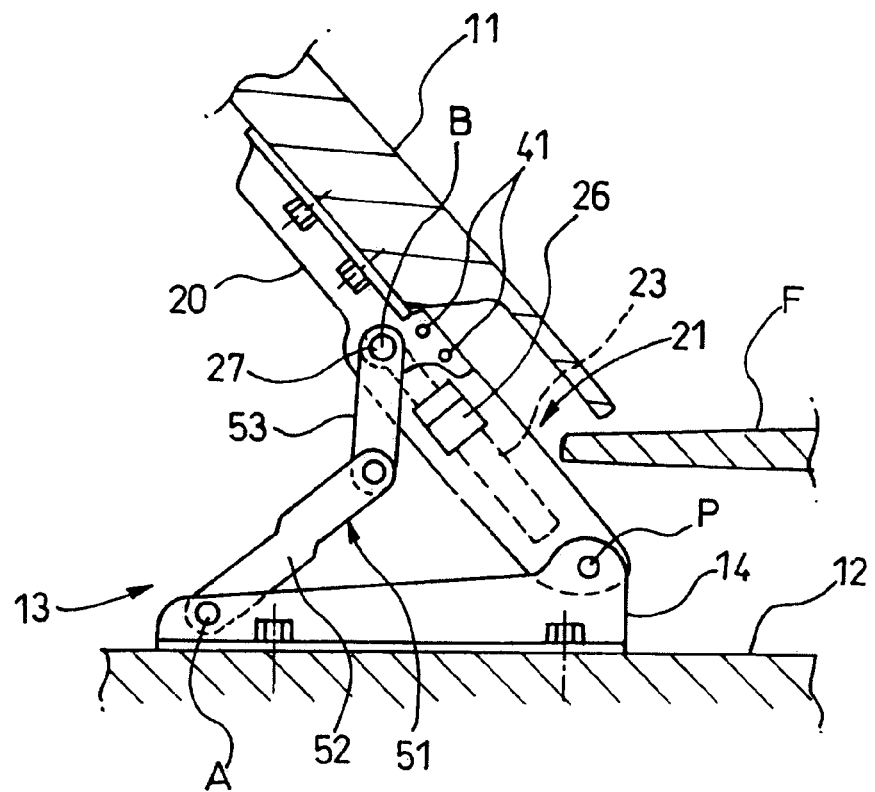
FIG. 15 is a sectional view illustrating how the hood is opened and closed.
Figure 16:
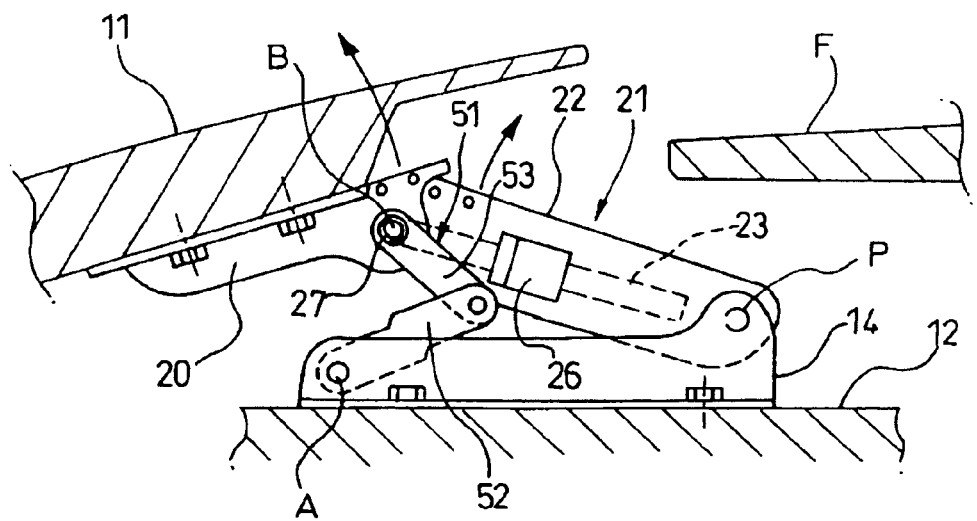
FIG. 16 is a side view illustrating the working of the vehicle safety device of the second embodiment.
Figure 17:
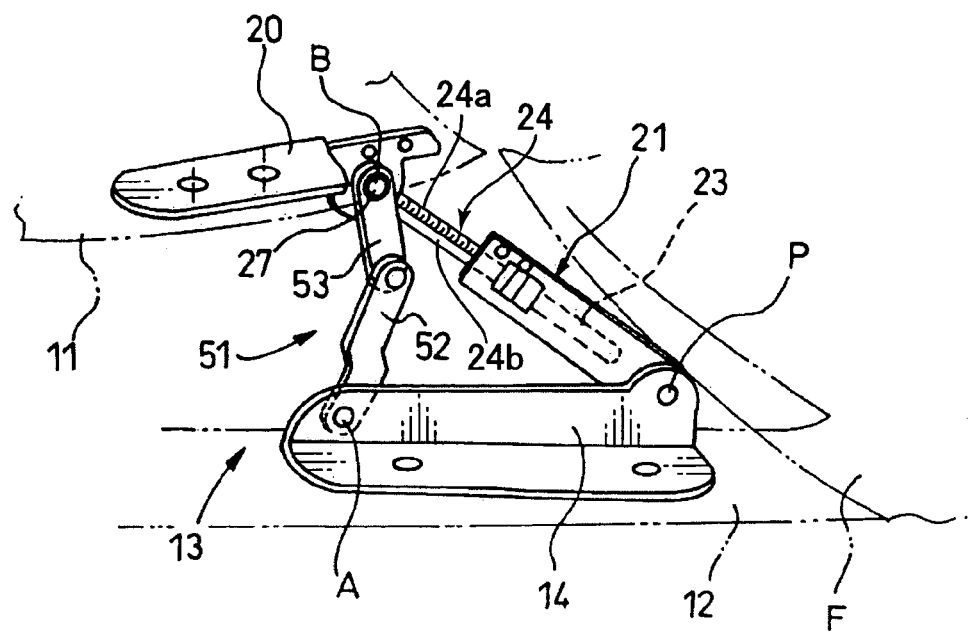
FIG. 17 is a side view also illustrating the working of the vehicle safety device of the second embodiment.
Figure 18:
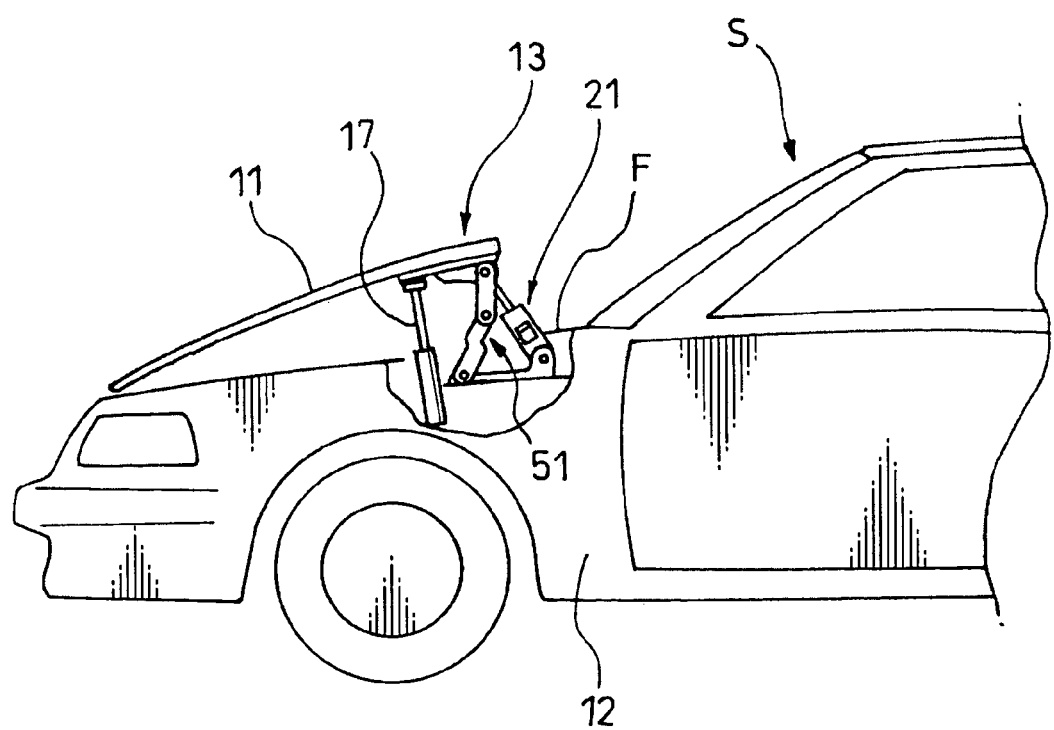
FIG. 18 is a side view of a forward portion of the vehicle illustrating the working of the vehicle safety device of the second embodiment.
Figure 19:
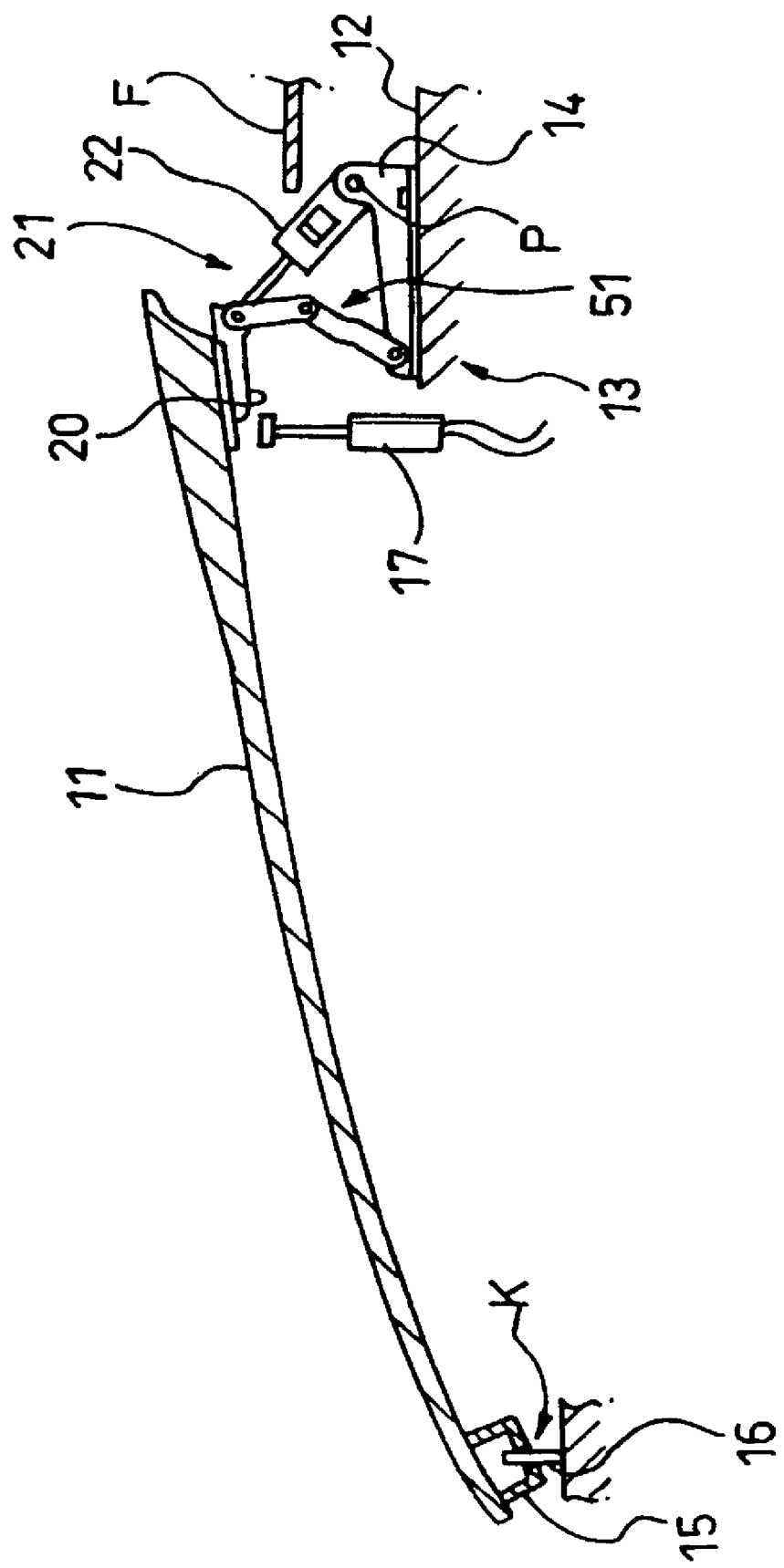
FIG. 19 is a side view of the hood and the associated components of the vehicle illustrating the working of the vehicle safety device of the second embodiment.

FIG. 12 is a side view of a hood 11 and associated components of a vehicle S provided with the vehicle safety device 13 of the second embodiment of the invention, FIG. 13 is a side view of the vehicle safety device 13, FIG. 14 is a perspective view of the vehicle safety device 13, and FIG. 15 is a sectional view of the vehicle safety device 13 illustrating how the hood 11 is opened and closed.

Unlike the vehicle safety device 13 of the first embodiment, the vehicle safety device 13 of the second embodiment is provided with a movement restriction mechanism 51 between a stationary bracket 20 and a support bracket 14 as shown in FIGS. 12 to 14, the movement restriction mechanism 51 including a pair of interconnected links 52, 53. The movement restriction mechanism 51 is structured such that one end of the link 52 is joined to the support bracket 14 at a connecting point A located close to a forward end thereof and one end of the other link 53 is joined to the stationary bracket 20 at a connecting point B located close to a rear end thereof. When the hood 11 is locked to a vehicle body 12 to close off an engine room, the movement restriction mechanism 51 is retracted with the two links 52, 53 folded. In this condition, the connecting point A between the link 52 and the support bracket 14 is located at the front of the connecting point B between the link 53 and the stationary bracket 20 as illustrated in FIG. 13.

When the engine room is exposed with the hood 11 swung up about a pivot P which joins the hood 11 to the vehicle body 12 as shown in FIG. 15, the two links 52, 53 of the movement restriction mechanism 51 which has been folded extend without resisting swinging motion of the hood 11.

Also when an obstacle sensor (not shown) detects an obstacle ahead of the vehicle S and the rear end of the hood 11 is raised as shown in FIGS. 16 to 19, the two links 52, 53 of the movement restriction mechanism 51 smoothly extend without resisting swinging motion of the hood 11. More specifically, when the obstacle sensor detects an obstacle, the obstacle sensor outputs an obstacle sensing signal and an actuator 17 instantly extends upward upon receiving the sensing signal fed from the obstacle sensor. Even when the rear end of the hood 11 is raised by the actuator 17 which has extended in this fashion, the stationary bracket 20 attached to the hood 11 and the support bracket 14 attached to the vehicle body 12 are still joined to each other by the movement restriction mechanism 51.

Figure 20:
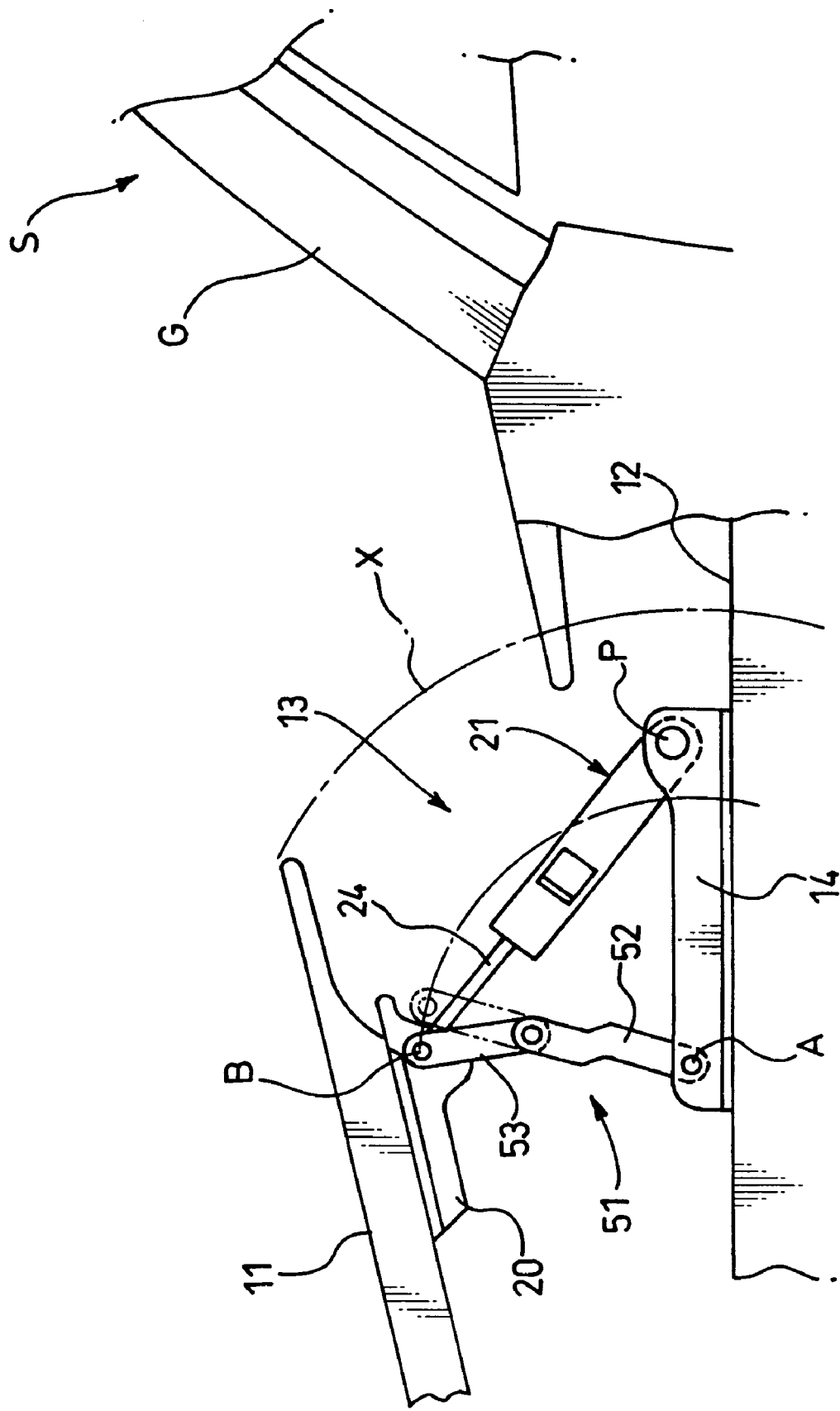
FIG. 20 is a side view of the vehicle safety device of the second embodiment showing in particular a situation in which the hood is raised.

Therefore, even if a mechanical connector 21 buckles due to a rearward external force acting on the hood 11 of which rear end has been raised as a result of repeated collisions of the vehicle S with an obstacle, for example, the links 52, 53 of the movement restriction mechanism 51 interconnecting the hood 11 and the vehicle body 12 serves to prevent the hood 11 from moving rearward up to a point where the rear end of the hood 11 goes rearward beyond a path X of swinging motion of the rear end of the hood 11 about the connecting point A between the link 52 and the support bracket 14 as shown in FIG. 20.

As mentioned in the foregoing discussion, the movement restriction mechanism 51 of the vehicle safety device 13 of the second embodiment keeps the hood 11 from moving rearward even when a rearward external force acts on the raised hood 11 as a result of repeated collisions of the vehicle S with an obstacle, for example. Accordingly, the vehicle safety device 13 of the embodiment can prevent the hood 11 from hitting against a windshield G of the vehicle S, for instance, in a reliable fashion.

The vehicle safety device 13 of the second embodiment is provided with the movement restriction mechanism 51 besides the mechanical connector 21 which is caused to extend by the upward thrusting force exerted on the hood 11 by the actuator 17 which joins the hood 11 to the vehicle body 12. This structure of the second embodiment makes it possible to restrict rearward movement of the hood 11 without causing an increase in size or cost of the mechanical connector 21 compared to a case where the mechanical connector 21 is stiffened to restrict rearward movement of the hood 11 without the provision of the movement restriction mechanism 51.

Also, since the connecting point A between the link 52 of the movement restriction mechanism 51 and the support bracket 14 is located at the front of the connecting point B between the other link 53 of the movement restriction mechanism 51 and the stationary bracket 20, it is possible to restrict rearward movement of the hood 11 in a more reliable fashion.

Furthermore, since the movement restriction mechanism 51 of the second embodiment has a simple structure including only the two interconnected links 52, 53, it is possible to restrict rearward movement of the hood 11 without causing an increase in size or cost of the vehicle safety device 13. In this connection, it is to be pointed out that the number of links constituting the movement restriction mechanism 51 is not necessarily be limited to two but the movement restriction mechanism 51 may include any number of links as appropriate.

Figure 21:
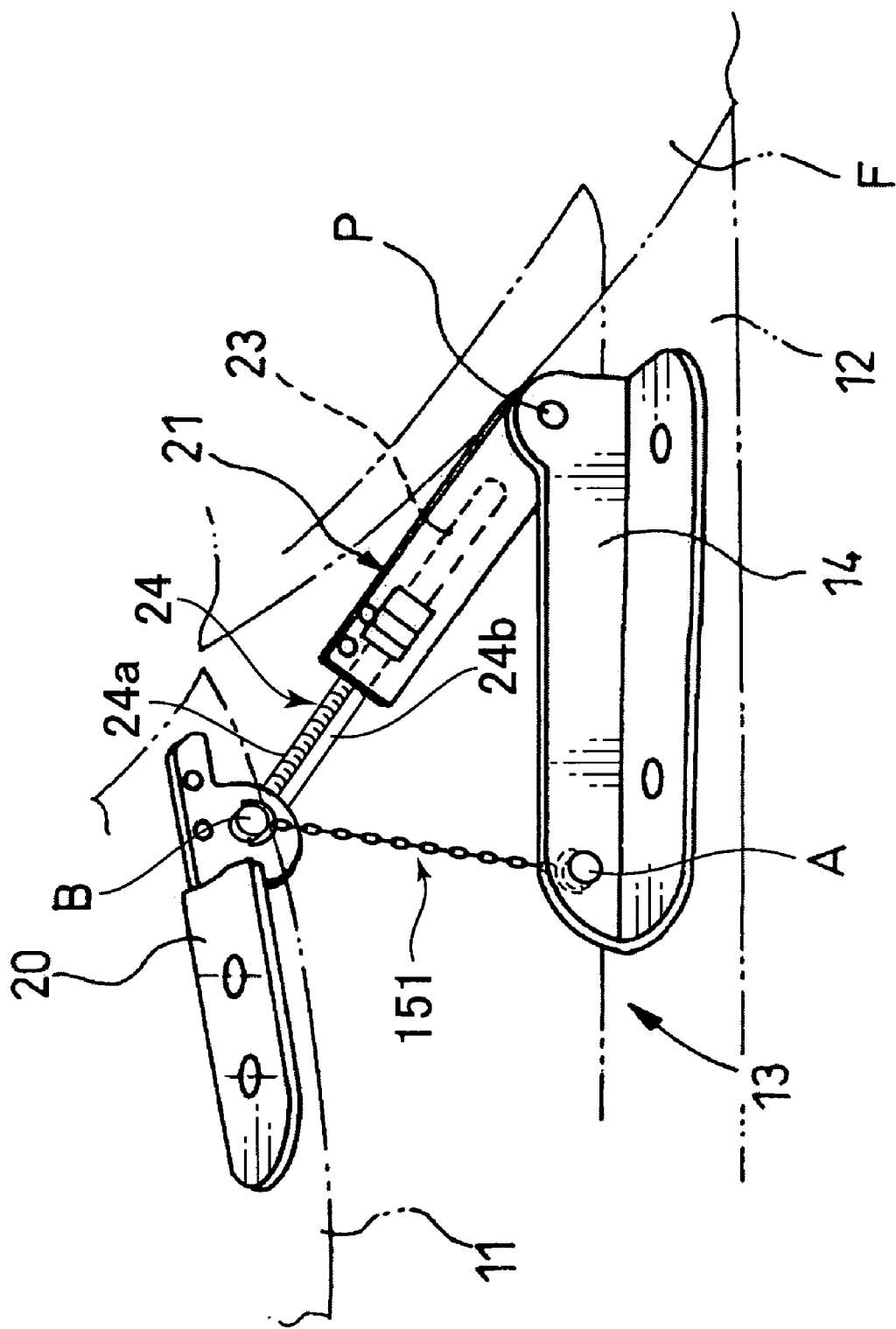
FIG. 21 is a side view of a modified vehicle safety device of the second embodiment.
Figure 22:
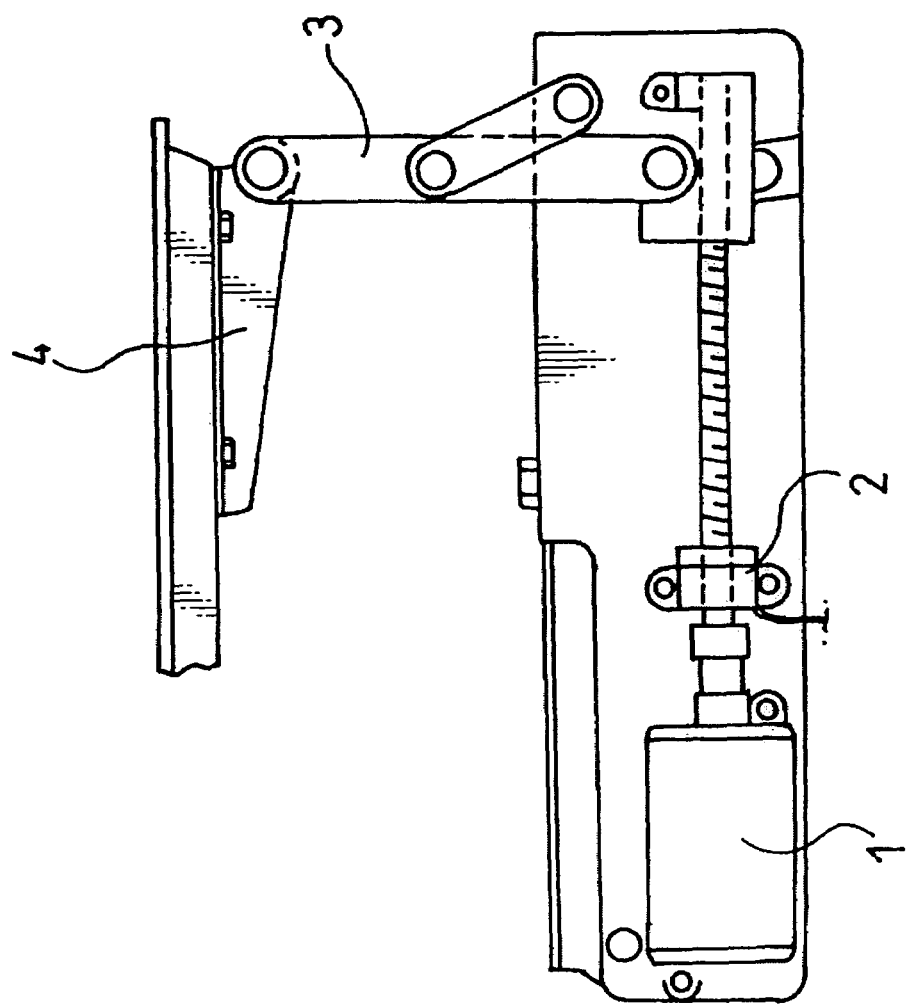
FIG. 22 is a side view of a conventional vehicle safety device.
Figure 23:
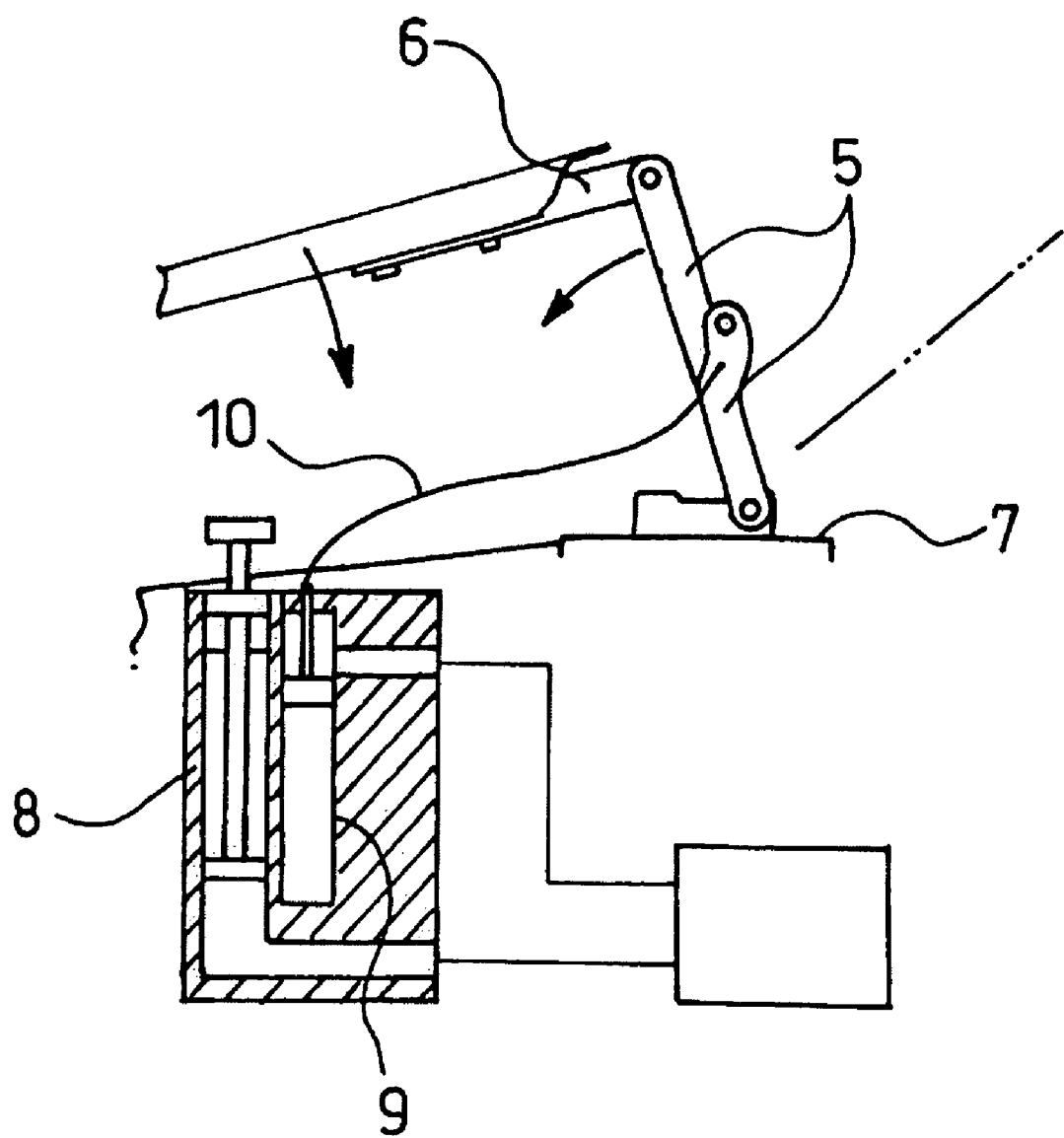
FIG. 23 is a partially sectional side view of another conventional vehicle safety device.

Moreover, the movement restriction mechanism 51 may be made of a bendable or pliable string, such as a chain or a wire. FIG. 21 shows a modified movement restriction mechanism 151 including a chain. The movement restriction mechanism 151 shown in FIG. 21 has the very simple construction that is made up of only a single chain in place of the two interconnected links 52, 53 of the movement restriction mechanism 51. Even such simple movement restriction mechanism 51 can restrict rearward movement of the hood 11 without causing an increase in size or cost of the vehicle safety device.

In summary, a vehicle safety device 13 of the invention is provided on a hood 11 which covers an engine room of a vehicle S when a forward end of the hood 11 is hooked to a vehicle body 12. The vehicle safety device 13 includes an actuator 17 which applies an upward thrusting force to the hood 11 from underside at a point close to a rear end thereof to raise the rear end of the hood 11 by a specific amount when an obstacle is detected, and a mechanical connector 21 which connects the rear end of the hood 11 to the vehicle body 12, the mechanical connector 21 being structured such that, when the actuator 17 raises the rear end of the hood 11, the mechanical connector 21 extends while swinging about a pivot P by which the mechanical connector 21 is joined to the vehicle body 12. The mechanical connector 21 includes a rod 24, and a locking part 26 having a through hole 32a in which the rod 24 is inserted, wherein the locking part 26 engages with the rod 24 in such a manner that the rod 24 can move in only one direction in which the rod 24 is extracted from the locking part 26, and the rod 24 is disengaged from the locking part 26 when the rod 24 and the locking part 26 are relatively turned about a longitudinal axis of the rod 24.

In the vehicle safety device thus structured, the actuator 17 applies an upward thrusting force to the hood 11 from underside at a point close to the rear end of the hood 11 of which forward end is joined to the vehicle body 12, causing the mechanical connector 21 connecting the rear end of the hood 11 to the vehicle body 12 to extend, when an obstacle is detected. With this arrangement, the rear end of the hood 11 is lifted in a swinging motion about a locking point K where the forward end of the hood 11 is locked to the vehicle body 12 in the event of a collision with the obstacle. Therefore, the raised hood 11 can receive the obstacle and effectively mitigate an impact acting on the obstacle in the collision.

According to the invention, the rod 24 can be disengaged from the locking part 26 by relatively turning the rod 24 and the locking part 26 about the longitudinal axis of the rod 24 and, then, the rod 24 can be retracted into the through hole in the locking part 26. Therefore, a user can contract the once extended mechanical connector 21 and lower the hood 11 quite easily to obtain an unobstructed forward view from a driver's seat.

Preferably, the rod 24 has a mating part 24a formed on part of a circumferential surface of the rod 24 along a longitudinal direction thereof, and the locking part 26 includes a meshing plug 34 having a mating part 34a which engages with the mating part 24a of the rod 24 in such a manner that the meshing plug 34 is biased toward the rod 24, wherein the rod 24 is disengaged from the meshing plug 34 of the locking part 26 when the rod 24 and the locking part 26 are relatively turned.

In this construction, the rod 24 can be easily disengaged from the meshing plug 34 of the locking part 26 by relatively turning the rod 24 and the locking part 26 about the longitudinal axis of the rod 24.

Preferably, the mating part 24a of the rod 24 and the mating part 34a of the meshing plug 34 have interengagable protrusions and recesses.

If the rod 24 and the locking part 26 are meshed by the protrusions and recesses 24a, 34a, the vehicle safety device 13 can be made at low cost with a simple structure.

In one preferable form of the invention, the vehicle safety device 13 further includes a movement restriction mechanism 51 which connects the hood 11 to the vehicle body 12 and prevents the hood 11 from moving rearward under conditions where the rear end of the hood 11 has been raised by the actuator 17.

If the vehicle safety device 13 is provided with such a movement restriction mechanism 51 for preventing the hood 11 of which rear end has been raised, it is possible to keep the hood 11 from moving rearward even when a rearward external force acts on the raised hood 11 as a result of repeated collisions of the vehicle S with an obstacle, for example. Accordingly, the vehicle safety device 13 of the invention can prevent the hood 11 from hitting against a windshield G of the vehicle S, for instance, in a reliable fashion.

Preferably, a connecting point A between the movement restriction mechanism 51 and the vehicle body 12 is located at the front of a connecting point B between the movement restriction mechanism 51 and the hood 11 in the vehicle safety device 13 thus structured.

If the connecting point A between the movement restriction mechanism 51 and the vehicle body 12 is located at the front of the connecting point B between the movement restriction mechanism 51 and the hood 11, it is possible to restrict rearward movement of the hood 11 in a reliable fashion.

Preferably, the movement restriction mechanism 51 is made up of a plurality of links 52, 53.

If the movement restriction mechanism 51 has such a simple structure including only the interconnected links 52, 53, it is possible to restrict rearward movement of the hood 11 without causing an increase in size or cost of the vehicle safety device 13.

Also, the movement restriction mechanism 51 may formed of a bendable string.

This movement restriction mechanism 51 can also restrict rearward movement of the hood 11 without causing an increase in size or cost of the vehicle safety device 13.

It is appreciated from the foregoing discussion that the vehicle safety device of the invention is effective for providing an unobstructed forward view for a driver of a vehicle by lowering a hood which has once been lifted upward.

This application claims priority from Japanese Patent Application Serial Nos. 2005-087139 and 2005-087140, both filed in Japan Patent Office on Mar. 24, 2005, thus the entire contents of which are incorporated by reference. Stated other way, it is deemed that the contents of aforementioned applications constitute part of this application.

Although the present invention has been described in term of specific exemplary embodiments, it will be appreciated that various changes and modifications may be made by those skilled in the art without departing from the spirits and scope of the invention, defined in the following claims.

What is claimed is:

1. A vehicle safety device provided on a hood which covers an engine room of a vehicle when a forward end of said hood is hooked to a vehicle body, said vehicle safety device comprising:
   an actuator which applies an upward thrusting force to the hood from underside at a point close to a rear end thereof to raise the rear end of the hood by a specific amount when an obstacle is detected, and
   a mechanical connector which connects the rear end of said hood to said vehicle body, said mechanical connector being structured such that, when said actuator raises the rear end of said hood, said mechanical connector extends while swinging about a pivot by which said mechanical connector is joined to said vehicle body, said mechanical connector including:
   a rod; and
   a locking part having a through hole in which said rod is inserted, wherein said locking part engages with said rod in such a manner that said rod can move in only one direction in which said rod is extracted from said locking part, and said rod is disengaged from said locking part when said rod and said locking part are relatively turned about a longitudinal axis of said rod, wherein said rod has a mating part formed only on a semi-cylindrical portion on one side of a curved outer surface of the rod along a longitudinal direction thereof and a smooth surface formed on a semi-cylindrical portion on the opposite side of the curved outer surface of the rod, said locking part includes a meshing plug having a mating part which engages with the mating part of said rod in such a manner that said meshing plug is biased toward said rod, and wherein said rod is disengaged from said meshing plug of said locking part when said rod and said locking part are relatively turned in such a way that said smooth surface of the rod is oriented toward the mating part of the meshing plug.

2. The vehicle safety device according to claim 1, wherein said rod has a mating part formed on a part of a circumferential surface of said rod along a longitudinal direction thereof, said locking part includes a meshing plug having a mating part which engages with the mating part of said rod in such a manner that said meshing plug is biased toward said rod, and wherein said rod is disengaged from said meshing plug of said locking part when said rod and said locking part are relatively turned.

3. The vehicle safety device according to claim 2, wherein the mating part of said rod and the mating part of said meshing plug have interengagable protrusions and recesses.

4. The vehicle safety device according to claim 1, further comprising a movement restriction mechanism which connects said hood to said vehicle body and prevents said hood from moving rearward under conditions where the rear end of said hood has been raised by said actuator.

5. The vehicle safety device according to claim 4, wherein a connecting point between said movement restriction mechanism and said vehicle body is located at the front of a connected point between said movement restriction mechanism and said hood.

6. The vehicle safety device according to claim 5, wherein said movement restriction mechanism includes a plurality of links.

7. The vehicle safety device according to claim 5, wherein said movement restriction mechanism includes a bendable string.

8. The vehicle safety device according to claim 4, where said movement restriction mechanism includes a plurality of links.

9. The vehicle safety device according to claim 4, wherein said movement restriction mechanism includes a bendable string.

* * * * *